United States Patent
Li et al.

(10) Patent No.: US 12,141,313 B2
(45) Date of Patent: Nov. 12, 2024

(54) SECURITY SEMANTICS FOR DATABASE QUERIES

(71) Applicant: International Business Machines Corporation, Armonk, NY (US)

(72) Inventors: Shuo Li, Beijing (CN); Xiaobo Wang, Beijing (CN); Sheng Yan Sun, Beijing (CN); Xing Xing Jing, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 991 days.

(21) Appl. No.: 16/991,182

(22) Filed: Aug. 12, 2020

(65) Prior Publication Data

US 2022/0050912 A1    Feb. 17, 2022

(51) Int. Cl.
*H04L 29/06* (2006.01)
*G06F 16/2453* (2019.01)
*G06F 16/2455* (2019.01)
*G06F 21/62* (2013.01)

(52) U.S. Cl.
CPC .... *G06F 21/6227* (2013.01); *G06F 16/24542* (2019.01); *G06F 16/2455* (2019.01)

(58) Field of Classification Search
CPC .......... G06F 21/6227; G06F 16/24542; G06F 16/2455; G06F 3/0622; G06F 16/24524; G06F 17/30433; G06F 16/245; G06F 16/24553; G06F 16/3331; G06F 16/835; G06F 16/90335; H04T 2001/221; H04W 12/08; H04W 36/0038; H04W 12/00; H04W 12/60; H04W 48/00; H04L 29/06061; H04L 69/06; H04L 29/06823; H04L 29/06829; H04L 63/01; H04N 19/70; G05B 2219/31166; G05B 2219/25231; G08B 13/19669; H04Q 2213/13339

See application file for complete search history.

(56) References Cited

U.S. PATENT DOCUMENTS

2010/0268722 A1 * 10/2010 Yalamanchi ........ G06F 16/9024
   707/E17.014
2016/0210324 A1 * 7/2016 Manamohan ....... G06F 16/2336

FOREIGN PATENT DOCUMENTS

WO    2013184523 A1    6/2012

OTHER PUBLICATIONS

Iggbom, "Filter Data with Tableau Using Axiomatics SmartGuard for Big Data", Axiomatics, May 5, 2020, 4 pages. https://www.axiomatics.com/blog/filter-data-tableau-using-axiomatics-smartguard-big-data/.

(Continued)

*Primary Examiner* — Wasika Nipa
*Assistant Examiner* — Leynna Truvan
(74) *Attorney, Agent, or Firm* — Daniel M. Yeates (57) ABSTRACT

A computer-implemented method to inject security semantics into database queries. The method includes receiving, by a database system, a query, wherein the query is received from a host and the query is generated by a first user account. The method also includes, generating an access plan for the query. The method further includes, determining a first portion of the access plan matches a first security syntax. The method includes, injecting, in response to determining the first portion of the access plan matches the first security syntax, the first security syntax into the access plan. The method further includes, executing the query. The method includes, returning a set of results of the query to the host.

17 Claims, 5 Drawing Sheets

(56) References Cited

OTHER PUBLICATIONS

"8 XPath Rewrite for Structured Storage", XML DB Developer's Guide, Oracle, 8 pages, printed Jun. 16, 2020.
"Create Security Policy (Transact-SQL)", SQL Server, Microsoft Docs, Aug. 10, 2017, 5 pages. https://docs.microsoft.com/en-us/sql/t-sql/statements/create-security-policy-transact-sql?view=sql-server-ver15.
Gowadia et al., "Tree Automata for Schema-Level Filtering of XML Associations.", Journal of Research and Practice in Information Technology, Feb. 2006, Research Gate, 14 pages. https://www.researchgate.net/publication/220535944_Tree_Automata_for_Schema-Level_Filtering_of_XML_Associations.
"Method for Controlling Access on Particular Fields in an XML/JSON Document in a Database", ip.com, An IP.com Prior Art Database Technical Disclosure, IP.com No. IPCOM000243600D, IP.com Electronic Publication Date: Oct. 5, 2015, 3 pages.
Mell et al., "The NIST Definition of Cloud Computing", Recommendations of the National Institute of Standards and Technology, Special Publication 800-145, Sep. 2011, 7 pages.

* cited by examiner

SECURITY SEMANTICS FOR DATABASE QUERIES

BACKGROUND

The present disclosure relates to database management, and, more specifically, using database native security syntax to increase the efficiency and security of database queries.

Modern database systems can contain large amounts of data (e.g., gigabytes, terabytes, petabytes, etc.). Generally, the data that is collected and stored is subject to security policies. Data owners and keepers can set up security and other access policies to attempt to ensure only authorized entities can access stored data. The policies can be based on business guidelines, laws, regulations, and other similar factors.

SUMMARY

Disclosed is a computer-implemented method for injecting security semantics into database queries. The method includes receiving, by a database system, a query, wherein the query is received from a host and the query is generated by a first user account. The method also includes, generating an access plan for the query. The method further includes, determining a first portion of the access plan matches a first security syntax. The method includes, injecting, in response to determining the first portion of the access plan matches the first security syntax, the first security syntax into the access plan. The method further includes, executing the query. The method includes, returning a set of results of the query to the host. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Modern database systems can contain large amounts of data (e.g., gigabytes, terabytes, petabytes, etc.). Generally, the data that is collected and stored is subject to security policies. Data owners and keepers can set up security and other access policies to attempt to ensure only authorized entities can access stored data. The policies can be based on business guidelines, laws, regulations, and other similar factors. Ensuring compliance with the various security policies can be a computationally expensive task.

In order to increase the efficiency and effectiveness of processing queries, embodiments of the present disclosure can use database native security syntax to increase the efficiency of and/or policy compliance of database queries.

The following acronyms may be used below:
API application program interface
ARM advanced RISC machine
CD-ROM compact disc ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
ROM read-only memory
SaaS software as a service
SLA service level agreement
SRAM static random-access memory
WAN wide-area network

Cloud Computing in General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
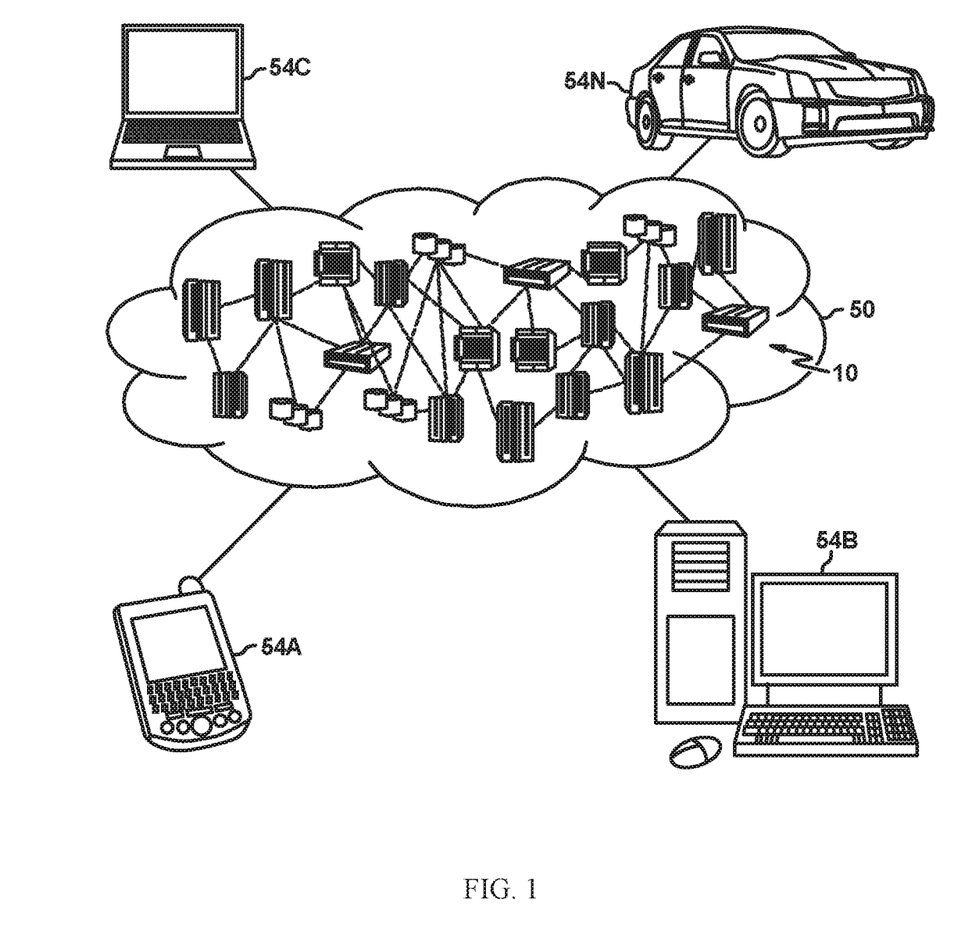
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
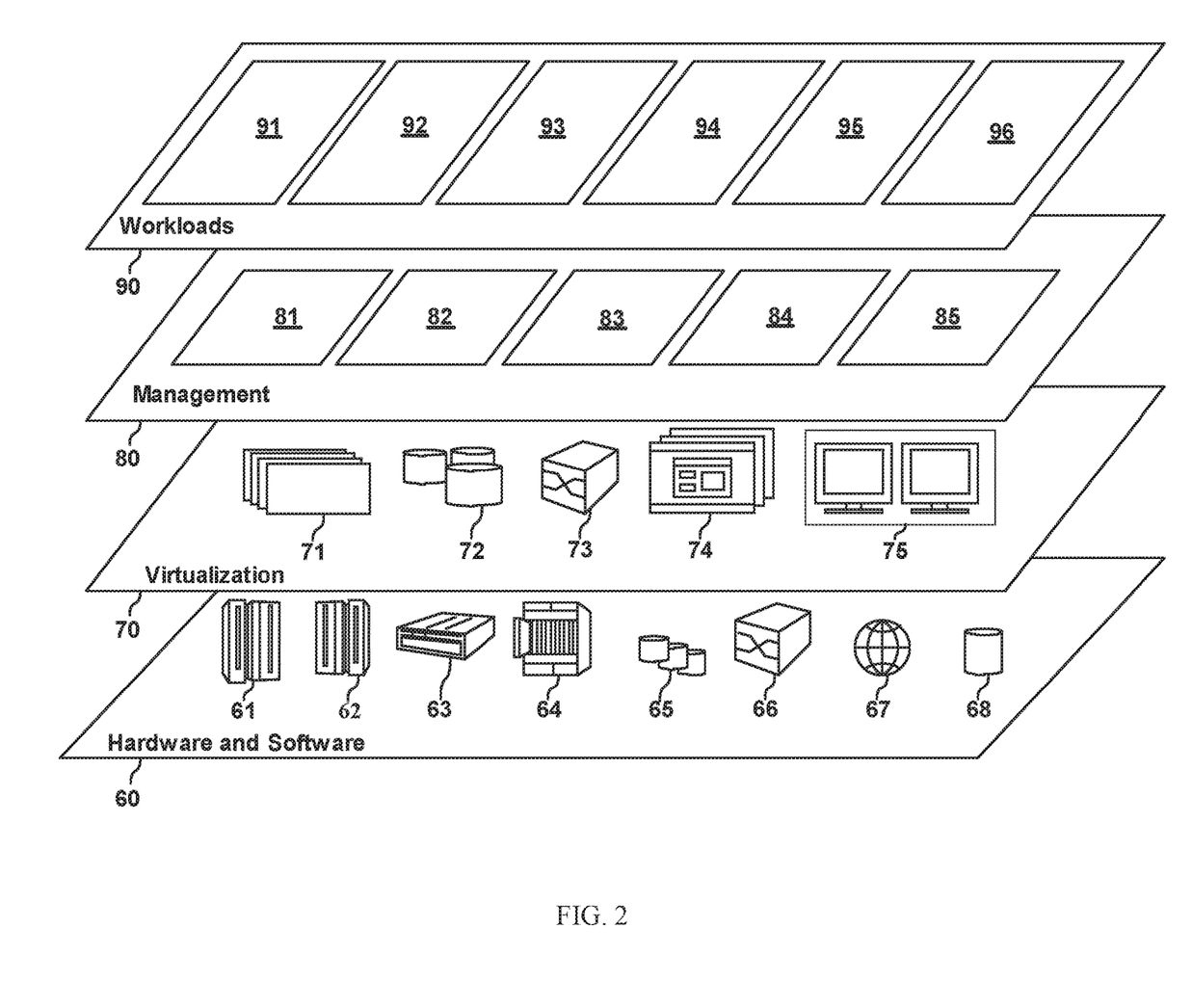
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System in General

Figure 3:
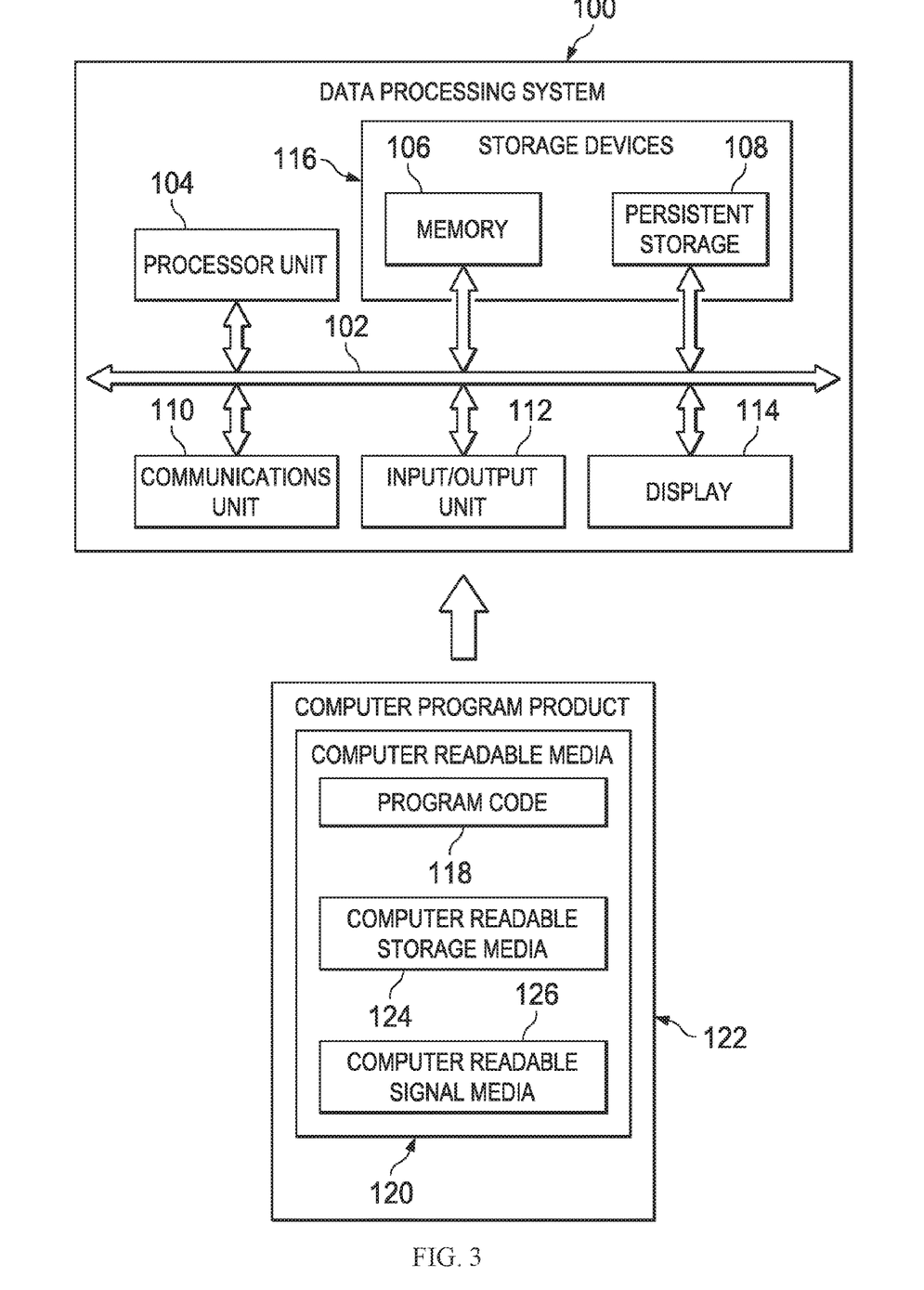
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

Database Native Security Syntax

Security policies for databases can be configured in several ways. One example is a database with a binary access policy. A user can have access to the entire database or have no access to any data in the database. More complex security policies can have several rules relating to who can view and/or manipulate which data in the database. In some embodiments, database access is managed by accounts. Each user/organization can have a unique account with permissions based on the privacy policy (or security policy). Each account can have a predetermined level of access. For example, a database system can have three tiers of access, a standard account, an admin account, and a super admin account, where each tier can access a different set of data. Additionally, there can be multiple types of accounts at the same tier (e.g., standard A and standard B), where each type can access different data based on the policy. For example, an employee in the sales department may have access to a different set of data than an employee in the purchasing department.

Structured query language (SQL) is a programming language designed for managing (storing and/or retrieving) data stored in one or more databases. The query may be parsed by an SQL parser. Parsing is the process of interpreting/translating the input into a form that can be processed by the database management system (DBMS). In some embodiments, parsing includes generating an access plan.

Ensuring compliance with the various security policies can be a computationally expensive task. It may require generating queries based on the privacy policy. This can require each query to be updated whenever there is a change in a privacy policy.

Embodiments of the present disclosure seek to improve the efficiency of processing queries by creating and/or using database native syntax. This can provide a computing cost and time saving in query processing, especially with complex data types. Embodiments of the present disclosure can also provide increased granularity in the security functions of a database query. This can reduce the amount of time and computing resources required to validate compliance with the privacy policy. Embodiments of the present disclosure can increase data security. Using native database syntax limits the exposure of the privacy policy at the application level. In some embodiments, the native syntax is generated in SQL.

Embodiments of the present disclosure can increase the efficiency of executing queries subject to a privacy policy. In some embodiments, the query is received by a query manager from a host. The query is received from a user account. The account has an account type (e.g., standard, admin, etc.). The privacy policy can include which account types have access to which data in the database.

Embodiments of the present disclosure can include one or more security syntax. The security syntax can be database native. The security syntax can be a conditional command. When the condition is satisfied, the security syntax is applied to the query to ensure access to data is in compliance with the privacy policy. In some embodiments, each syntax can be an element transformer or an element filter. An element transformer can be a tree-based set of commands that transform a portion of the data obtained in a query into a form that prevents viewing the data (e.g., obfuscation, generalization, etc.). An element filter can be a tree-based set of commands that filters out a portion of data that would otherwise be returned with results of a query. Both the element transformer and element filter tree-based actions can be injected into an access path. Each security syntax can include one or more conditional statements (e.g., if A then B) configured to limit access to data in the database. In some embodiments, the security syntax can be based on an execution path or a portion of the execution path.

In some embodiments, the privacy policy and/or the security policy can be defined in light of the security syntax. For example, the privacy policy can identify an account type and an execution path (or partial path).

Embodiments of the present disclosure can compare the access path of the query against the privacy policy and/or each security syntax. In some embodiments, it is determined when a match is present. In some embodiments, the access path can be altered in response to determining the match.

Embodiments of the present disclosure can inject the security syntax into the access plan. Said differently, the access plan is modified, in response to determining a first portion of the access plan matches a security syntax. In some embodiments, more than one security syntax can be injected into the access plan. In some embodiments, the query is executed and the results are returned to the host.

The aforementioned advantages are example advantages, and embodiments exist that can contain all, some, or none of the aforementioned advantages while remaining within the spirit and scope of the present disclosure.

Figure 4:
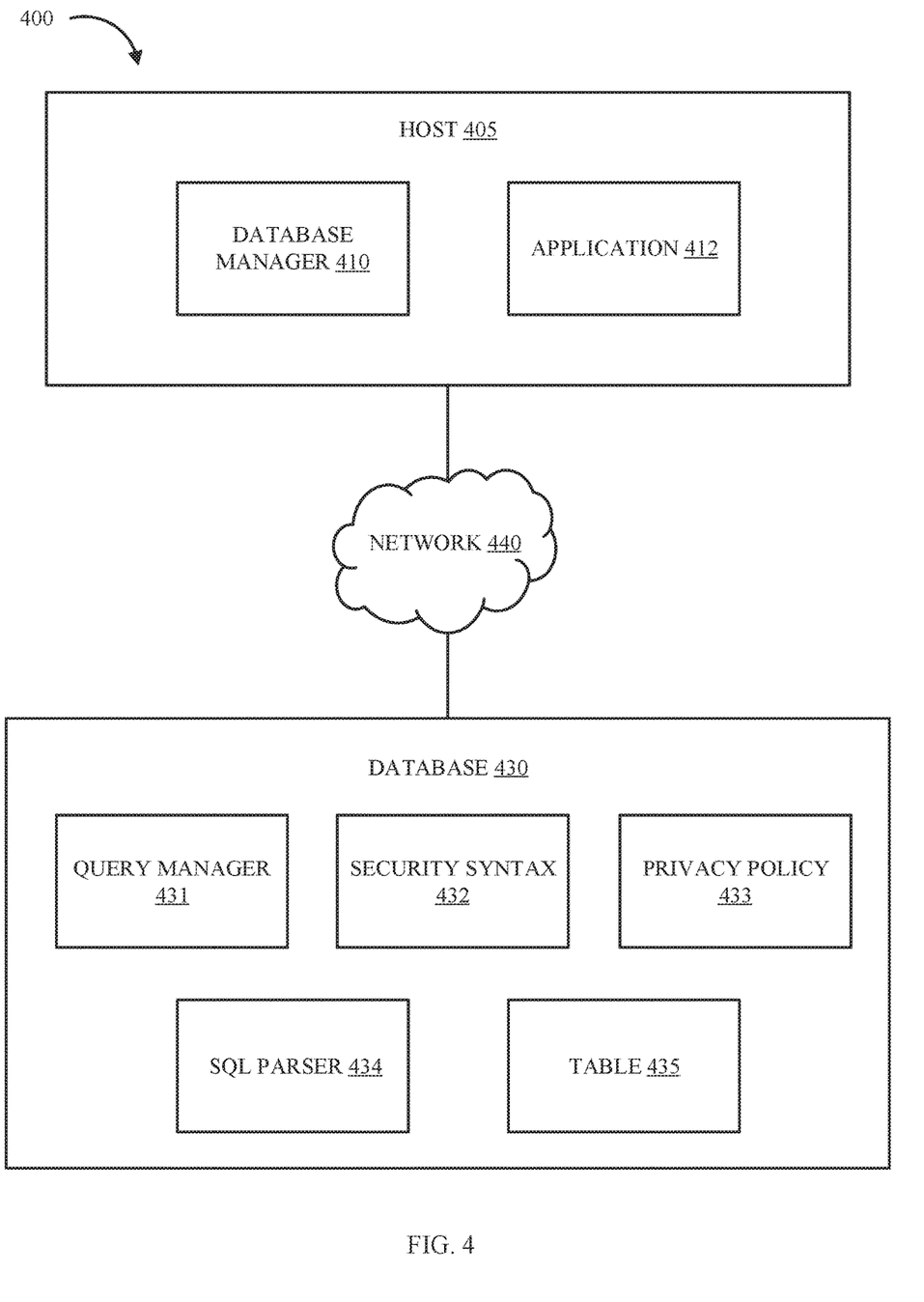
FIG. 4 illustrates a functional diagram of a computing environment suitable for operation of a query manager in accordance with some embodiments of the present disclosure.

Referring now to various embodiments of the disclosure in more detail, FIG. 4 is a representation of a computing environment 400, that is capable of running a query manager in accordance with one or more embodiments of the present disclosure. Many modifications to the depicted environment may be made by those skilled in the art without departing from the scope of the disclosure.

Computing environment 400 includes host 405, database 430, and network 440. Network 440 can be, for example, a telecommunications network, a local area network (LAN), a wide area network (WAN), such as the Internet, or a combination of the three, and can include wired, wireless, or fiber optic connections. Network 440 may include one or more wired and/or wireless networks that are capable of receiving and transmitting data, voice, and/or video signals, including multimedia signals that include voice, data, and video information. In general, network 440 may be any combination of connections and protocols that will support communications between host 405, database 430, and other computing devices (not shown) within computing environment 400. In some embodiments, host 405, and/or database 430 may include a computer system, such as the data processing system 100. In some embodiments, host 405, and database 430 are included in the same computing device, however, they are shown as separate for discussion purposes.

Host 405 can be a standalone computing device, a management server, a web server, a mobile computing device, or any other electronic device or computing system capable of receiving, sending, and processing data. In other embodiments, host 405 can represent a server computing system utilizing multiple computers as a server system, such as in a cloud computing environment 50. In some embodiments, host 405 represents a computing system utilizing clustered computers and components (e.g., database server computers, application server computers, etc.) that act as a single pool of seamless resources when accessed within computing environment 400. In some embodiments, host 405 includes database manager 410, and application 412.

Database manager 410 can be any combination of hardware and/or software configured to manage database operations. The operations may include storing, retrieving, querying, manipulating, monitoring, and analyzing data along with other similar operations. In some embodiments, database manager 410 includes a database management system (DBMS). In some embodiments, database manager 410 is part of a federated database system (which can include database 430). A federated database system can transparently map multiple autonomous database systems into a single federated (combined) database. In some embodiments, a federated database system acts as a virtual database, where there is no actual data integration in the constituent databases.

Application 412 can be any combination of hardware and/or software that is configured to generate a query. A query can be a request for data and/or information stored in one or more tables of one or more databases. The databases may be local (e.g., on host 405), or remote (e.g., database 430). In some embodiments, application 412 sends the query to database manager 410. In some embodiments, application 412 is included in database manager 410. In some embodiments, application 412 can include a permissioned base access system. The permission-based access can limit users from viewing/retrieving specific data based on one or more policies (e.g., privacy policy 433). The permissions can be based on an account type (or account tier). There can be any number of account tiers (e.g., standard, admin, super admin, etc.)

In some embodiments, application 412 is part of a computing device separate from host 405. The computing device may communicate with host 405 via network 440. In some embodiments, the computing device can generate queries, send queries to host 405, and/or receive and display the results of the query. In some embodiments, application 412 can include (or be considered) two or more separate applications, wherein each application is configured to generate and send queries to database 430. In some embodiments, the displayed data is transformed and/or filtered based on the privacy policy and/or the account type of the user requesting the data.

In some embodiments, the query is generated in Structured Query Language (SQL). In some embodiments, application 412 displays the results of the query. The results may be returned in an SQL format, and/or as images, graphs, trends, and/or other similar formats.

In some embodiments, application 412 includes one or more tiers of user accounts. Each user account is correlated to a tier (or type) of account. The account type can be included in the query and/or sent with the query to the database.

Database 430 can be any combination of hardware and/or software configured to store data in a database system. In some embodiments, database 430 is part of a federated database system. In some embodiments, database 430 includes two or more databases communicatively connected.

In some embodiments, database 430 may be contained within host 405. In some embodiments, database 430 can include query manager 431, security syntax 432, privacy policy 433, SQL parser 434, and table 435.

Query manager 431 can be any combination of hardware and/or software configured to oversee execution of an SQL query. In some embodiments, query manager 431 includes security syntax 432, privacy policy 433, SQL parser 434, and table 435. However, FIG. 4 depicts them as separate components for discussion purposes.

Security syntax 432 can be one or more database native rules/definitions configured to enhance database security measures. The security syntax can include one or more definitions/rules that define when a particular subset of data should be treated in a particular manner. Security syntax 432 can include one or more definitions.

In some embodiments, the one or more definitions include a transformer syntax. Transformer syntax can identify the affected data and alter/transform the data into a non-sensitive form. The transformation can include redaction, generalization, obfuscation, and/or other similar techniques. A transform command can change/transform the data displayed when the query is complete. Rather than returning the value specified by the query, an alter form will be returned. The altered data can replace the value with a different indication (e.g., "Confidential") or with hash mark (e.g., ###-##-####). The transform command is executed in the database, so the actual value is not just masked. Rather the data is not fetched/gathered/recorded by the query. This greatly reduces the risk of the data unintentionally being disseminated to an unauthorized party. In some embodiments, a transformer syntax can include a unique name (e.g., transformer name), one or more applicable tables (e.g., table name), one or more applicable columns (e.g., column name), one or more conditions/expression, and an enable/disable indicator. For example, a first transform syntax can be "transform phone" configured to generalize a phone number in a record in a table "SALES" for all "standard" accounts. Define transformer—Transform Phone 1—on table 'SALES'—column 'PHONE—for 'standard account'; generalize'—enable".

In some embodiments, the one or more definitions can include a filter syntax. A filter command can remove the data from the results. For example, if a query requested columns 1-3 of table 1, but the filter command required column 2 to be filtered, the return will display columns 1 and 3. This can be accomplished by injecting a filter command into the access path. As another example, a privacy policy could limit access to all rows in column 1 with a value greater than "X". The filter syntax would then return only rows where column 1 had a value less or equal to X and filter out all remaining rows. In some embodiments, a filter syntax can include a unique name (e.g., filter name), one or more applicable tables (e.g., table name), one or more applicable columns (e.g., column name), one or more conditions, and an enable/disable indicator. For example, a filter syntax can be "Define filter—Filter address 1—on table 'SALES'—column 'address'—for 'standard account';—disable". This syntax is configured to filter/disable the address column for each query submitted by a standard account.

In some embodiments, each syntax (or syntax definition) is either a transformer or a filter. In some embodiments, a single query can use one or both of a transformer syntax and a filter syntax. In some embodiments, each syntax is a tree-based syntax. Tree based syntax can include a series of if-then rules to generate a portion of an access plan.

In some embodiments, security syntax 432 is configured to be compatible with one or more different security policies (e.g., privacy policy 433).

Privacy policy 433 can a set of rules that define/control access to data stored in database 430. In some embodiments, privacy policy includes one or more rules. In some embodiments, the rules are based on account type. There can be any number of account types, where each type can have different access to the data. For example, assume the policy has three account types, Type A, Type B, and Type C. In one example, Type A can be standard access, Type B can be admin access, and Type C super admin access. Each type can have access to everything of the lower type (e.g., Type B has access to all Type A data) and additional data. Another example, the three types can all be standard but have access to different columns and/or tables (e.g., Type A can access Table 1, Type B can access Table 2 Columns 1-3, and Type C can access Table 2 Columns 3-5). The Types' access can be overlapped. In some embodiments, there is combination of the two previous examples (e.g., there are two types of standard accounts and two types of admin accounts).

In some embodiments, the privacy policy can include conditional access. For example, if a table includes customer purchase data, a first account type can view any data where the purchase amount (e.g., where a column includes purchase amount) is less than a predefined amount, and a second type of account can view the data for any purchase amount. In some embodiments, privacy policy can include tree-based rules for access.

SQL parser 434 can be any combination of hardware and/or software configured to determine actions to be performed from a query. In some embodiments, SQL parser 434 determines individual commands to complete the query. In some embodiments, SQL parser 434 develops an access plan. The access plan may include a stack(set) of commands, where each command is considered a node. In some embodiments, SQL parser 434 can modify a received query. The modification can include injecting (or editing the access plan) security nodes into the access plan. The modification can be based on security syntax included in the received query and/or privacy policy 433. In some embodiments, SQL parser 434 compares the query against the security syntax. In response to determining the query matches the syntax, the SQL parser 434 alters/injects the security steps/nodes into the access plan.

Table 435 can be any data structure configured to store and organize data. Table 435 can include one or more separate tables. Each table can include one or more columns. In some embodiments, table 435 is a target of queries. In some embodiments, access to the data stored in table 435 can be subject to privacy policy 433.

Figure 5:
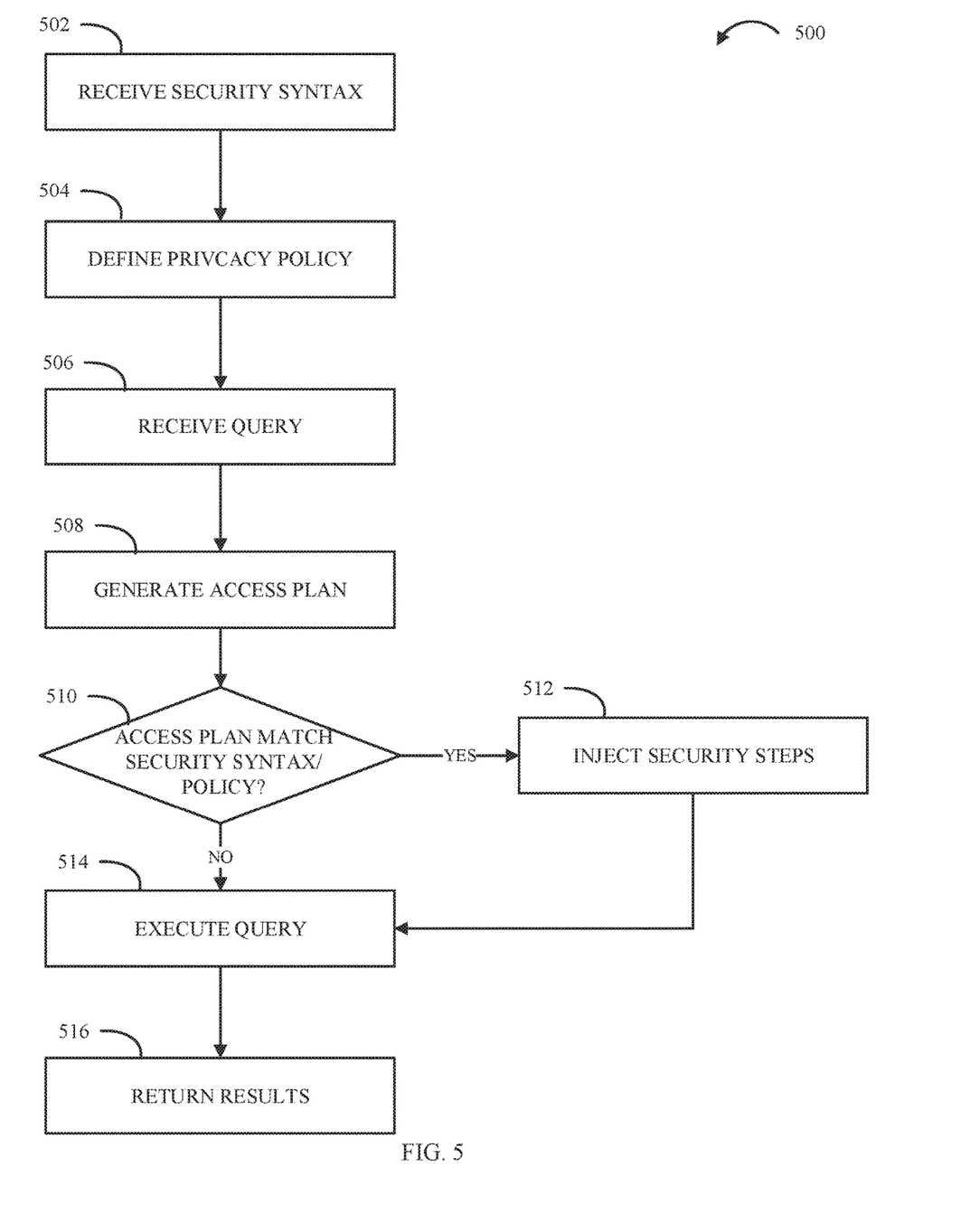
FIG. 5 illustrates a flow chart of an example method to inject security syntax into queries in accordance with some embodiments of the present disclosure.

FIG. 5 depicts a flowchart of example method 500 for injecting security syntax into queries that can be performed in a computing environment (e.g., computing environment 400 and/or cloud computing environment 50). One or more of the advantages and improvements described above for injecting security syntax into queries may be realized by method 500, consistent with various embodiments of the present disclosure.

Method 500 can be implemented by one or more processors, host 405, database manager 410, database 430 its subcomponents, and/or a different combination of hardware and/or software. In various embodiments, the various operations of method 500 are performed by one or more of host 405, database manager 410, and/or database 430. For illustrative purposes, the method 500 will be described as being performed by query manager 431.

At operation 502, query manager 431 receives/updates security syntax. In some embodiments, the security syntax is generated by one or more users. The generated syntax can be sent to the database manager 410 and/or database 430 to be updated. The security syntax can include one or more unique definitions. In some embodiments, a transform syntax and/or a filter syntax is received.

At operation 504, query manager 431 defines/receives a privacy policy. In some embodiments, the privacy policy is generated by one or more users. In some embodiments, the privacy policy includes one or more rules that define access to data stored in database 430. In some embodiments, the rules are based on an account type. The account type corresponds to an account that initiates a query. In some embodiments, the rules define which account type can access or cannot access which tables, columns, and/or subset of data in tables and columns. In some embodiments, the privacy policy is defined according to the security syntax. For example, the rules in the privacy policy can reference one or more of the security syntaxes.

In some embodiments, the rules can be based on a query originating location. For example, the policy may permit employees of a company to access data related to employees that work in a common office. In another example, the policy can be based on geographic/geopolitical boundaries (e.g., countries, states, cities, etc.).

At operation 506, query manager 431 receives a query. In some embodiments, the query is received from application 412. The query can be configured to retrieve data from a table (e.g., table 435). In some embodiments, the query is received in SQL. In some embodiments, the query is configured to perform one or more commands on a set of data, wherein the data is stored in database 430. In some embodiments, the query is received from a user account. The user account can have one or more access rights and/or access restriction based on the defined privacy policy.

At operation 508, query manager 431 generates an access plan. An access plan may include which commands should be performed on which data to obtain the desired result. In some embodiments, the access plan includes an access tree. In some embodiments, operation 508 include optimization. Query optimization is the process of selecting a path/order to perform the query that is anticipated to be most efficient. The optimization can be performed by an optimizer.

At operation 510, query manager 431 determines if access plan matches security syntax and/or the privacy policy. In some embodiments, operation 510 includes comparing the account type of the query against the privacy policy.

In some embodiments, operation 510 includes comparing the access path (xpath) against the security syntax definitions. If there is a common expression between the access path, and the privacy policy and the syntax, then it is determined there is a match. For example, assume there is an "order transformer" syntax for column "Order" on path "/Orders/Order/name". If the access path includes the statement "Query($i/Orders/Order/name)" then there is a match. If the access path includes the statement "Query($i/Orders/Order/type)" then there is not a match.

If query manager 431 determines there is a match (510: YES), then query manager 431 proceeds to operation 512. If query manager 431 determines there is not a match (510: NO), then query manager 431 proceeds to operation 514. In some embodiments, a match includes a privacy policy match and a security syntax match.

At operation 512, query manager 431 injects the security steps into the access plan. In some embodiments, the injection can alter (or regenerate) the access plan. The alteration can include inserting and/or removing steps based on the rules in the privacy policy and/or security syntax.

At operation 514, query manager 431 executes the query. In some embodiments, the query is executed based on the access plan. In some embodiments, executing the query can include transforming and/or filtering the data based on the injected security syntax.

At operation 516, query manager 431 returns the results. In some embodiments, the results are returned to the requestor (e.g., host 405). In some embodiments, the results can be displayed/viewed on one or more devices.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
receiving, by a database system, a first security syntax, wherein the first security syntax is database native and comprises for a first subset of data in the database system a first definition of the subset of data and a first rule to manage the first subset of data;
receiving, in response to the receiving the first security syntax and by the database system, a query, wherein the query is received from a host, the query is configured to obtain a set of data from the database system, and the query is generated by a first user account;
generating an access plan for the query, wherein the access plan is a set of commands to obtain the set of data including the first subset of data;
comparing the access plan to a privacy policy, wherein the privacy policy is defined based on the first security syntax;
determining a first portion of the access plan matches the privacy policy;
injecting, in response to determining the first portion of the access plan matches the privacy policy, the first rule to manage the first subset of data of the first security syntax into the access plan, wherein the injecting alters the access plan to return an altered set of results;
executing, based on the altered access plan, the query; and
returning the altered set of results of the query to the host.

2. The method of claim 1, wherein the first security syntax is tree based.

3. The method of claim 1, further comprising:
defining the first security syntax, wherein the first security syntax is configured to limit access to a portion of data in the database system, and the receiving the first security syntax is in response to the defining.

4. The method of claim 3, wherein the first security syntax is an element transformer.

5. The method of claim 3, wherein the first security syntax in an element filter.

6. The method of claim 3 further comprising:
defining, in response to defining the first security syntax, the privacy policy, wherein the privacy policy is configured to indicate a first account type can access a first set of data in the database system.

7. The method of claim 6, wherein the privacy policy links a type of the first user account to the first security syntax.

8. The method of claim 1, wherein the first security syntax is an element transformer, the method further comprising:
determining a second portion of the access plan matches a second security syntax; and
injecting, in response to determining the second portion of the access plan matches the second security syntax, the second security syntax into the access plan, wherein the second security syntax is an element filter.

9. A system comprising:
a processor; and
a computer-readable storage medium communicatively coupled to the processor and storing program instructions which, when executed by the processor, are configured to cause the processor to:
receive, by a database system, a first security syntax, wherein the security syntax is database native and comprises for a first subset of data in the database system a first definition of the subset of data and a first rule to manage the first subset of data;
receive, in response to the receiving the first security syntax and by the database system, a query, wherein the query is received from a host, the query is configured to obtain a set of data from the database system, and the query is generated by a first user account;
generate an access plan for the query, wherein the access plan is a set of commands to obtain the set of data including the first subset of data;
compare the access plan to a privacy policy, wherein the privacy policy is defined based on the security syntax;
determine a first portion of the access plan matches the privacy policy;
inject, in response to determining the first portion of the access plan matches the privacy policy, the first rule to manage the first subset of data of the first security syntax into the access plan, wherein the injecting alters the access plan to return an altered set of results;
execute, based on the altered access plan, the query; and
return the altered set of results of the query to the host.

10. The system of claim 9, wherein the program instructions are further configured to cause the processor to:
define the first security syntax, wherein the first security syntax is configured to limit access to a portion of data in the database system.

11. The system of claim 10, wherein the first security syntax is an element transformer.

12. The system of claim 10, wherein the first security syntax in an element filter.

13. A computer program product, the computer program product comprising a computer readable storage medium having program instructions embodied therewith, the program instructions executable by a processing unit to cause the processing unit to:
receive, by a database system, a first security syntax, wherein the security syntax is database native and comprises for a first subset of data in the database system a first definition of the subset of data and a first rule to manage the first subset of data;
receive, in response to the receiving the first security syntax and by the database system, a query, wherein the query is received from a host, the query is configured to obtain a set of data from the database system, and the query is generated by a first user account;
generate an access plan for the query, wherein the access plan is a set of commands to obtain the set of data including the first subset of data;
compare the access plan to a privacy policy, wherein the privacy policy is defined based on the security syntax;
determine a first portion of the access plan matches the privacy policy;
inject, in response to determining the first portion of the access plan matches the privacy policy, the first rule to manage the first subset of data of the first security syntax into the access plan, wherein the injecting alters the access plan to return an altered set of results;
execute, based on the altered access plan, the query; and return the altered set of results of the query to the host.

14. The computer program product of claim 13, wherein the program instructions are further configured to cause the processing unit to:
   define the first security syntax, wherein the first security syntax is configured to limit access to a portion of data in the database system.

15. The computer program product of claim 14, wherein the query is received in response to defining the first security syntax.

16. The computer program product of claim 15 further comprising:
   defining, in response to defining the first security syntax, the privacy policy.

17. The computer program product of claim 16, wherein the program instructions are further configured to cause the processing unit to:
   determine a second portion of the access plan matches a second security syntax; and
   inject, in response to determining the second portion of the access plan matches the second security syntax, the second security syntax into the access plan, wherein the second security syntax is an element filter.

* * * * *